(12) United States Patent
Kimura et al.

(10) Patent No.: US 9,528,404 B2
(45) Date of Patent: Dec. 27, 2016

(54) POWER TRANSMISSION DEVICE

(71) Applicants: Hiroaki Kimura, Toyota (JP); Akiko Nishimine, Toyota (JP); Takeshi Kuwahara, Nisshin (JP); Ryota Takayanagi, Toyota (JP)

(72) Inventors: Hiroaki Kimura, Toyota (JP); Akiko Nishimine, Toyota (JP); Takeshi Kuwahara, Nisshin (JP); Ryota Takayanagi, Toyota (JP)

(73) Assignee: TOYOTA JIDOSHA KABUSHIKI KAISHA, Toyoto-Shi (JP)

( * ) Notice: Subject to any disclaimer, the term of this patent is extended or adjusted under 35 U.S.C. 154(b) by 156 days.

(21) Appl. No.: 14/096,173

(22) Filed: Dec. 4, 2013

(65) Prior Publication Data

US 2014/0158467 A1 Jun. 12, 2014

(30) Foreign Application Priority Data

Dec. 6, 2012 (JP) ................................. 2012-266927

(51) Int. Cl.

| F01M 11/02 | (2006.01) |
| F01M 5/00 | (2006.01) |
| F01M 11/10 | (2006.01) |
| F16H 57/04 | (2010.01) |
| F01M 5/02 | (2006.01) |

(52) U.S. Cl.
CPC .............. *F01M 11/02* (2013.01); *F01M 5/002* (2013.01); *F01M 11/10* (2013.01); F01M 2005/026 (2013.01); F16H 57/0424 (2013.01); F16N 2250/08 (2013.01)

(58) Field of Classification Search
CPC .... F16N 7/38; F16N 2250/08; F16H 61/0031; F16H 57/0412; F16H 57/0421; F16H 57/0424; F16H 57/0434; F01M 11/02; F01M 2001/123; F01M 2011/0066
See application file for complete search history.

(56) References Cited

U.S. PATENT DOCUMENTS

| 7,007,655 | B2 * | 3/2006 | Yamamoto | F01M 1/02 |
| | | | | 123/196 CP |
| 7,124,732 | B2 * | 10/2006 | Sugamuna | F01M 1/02 |
| | | | | 123/196 R |
| 7,287,507 | B2 * | 10/2007 | Futamura | F01M 11/02 |
| | | | | 123/196 R |
| 7,337,755 | B2 * | 3/2008 | Gokan | F01M 5/007 |
| | | | | 123/193.3 |
| 7,946,389 | B2 * | 5/2011 | Kakinami | F16H 57/04 |
| | | | | 123/196 R |
| 8,068,966 | B2 * | 11/2011 | Wu | B60K 6/365 |
| | | | | 701/51 |

(Continued)

FOREIGN PATENT DOCUMENTS

| CN | 101290064 A | 10/2008 |
| JP | 2004-068732 A | 3/2004 |

(Continued)

*Primary Examiner* — Minh Truong
(74) *Attorney, Agent, or Firm* — Andrews Kurth Kenyon LLP

(57) ABSTRACT

A power transmission device has a first check valve and a second check valve on the respective discharge passages. An oil temperature sensor is disposed at a position that is vertically lower than an oil-introducing portion of a merging section.

2 Claims, 4 Drawing Sheets

(56) References Cited

U.S. PATENT DOCUMENTS

| | | | | |
|---|---|---|---|---|
| 8,108,115 | B2* | 1/2012 | Kobayashi | F16H 61/143 192/3.28 |
| 8,793,044 | B2* | 7/2014 | Miyamoto | F16H 61/30 417/426 |
| 8,912,691 | B2* | 12/2014 | Miyamoto | F28D 21/00 137/468 |
| 9,108,499 | B2* | 8/2015 | Long | B60K 6/48 |
| 2004/0029677 | A1 | 2/2004 | Mori et al. | |
| 2007/0098567 | A1* | 5/2007 | Johnson | F04C 11/00 417/199.1 |
| 2008/0286123 | A1* | 11/2008 | Yoshinami | F04C 2/102 417/118 |
| 2008/0308355 | A1 | 12/2008 | Kakinami et al. | |
| 2009/0232673 | A1* | 9/2009 | Reisch | F16H 57/0434 417/364 |
| 2010/0204008 | A1 | 8/2010 | Azuma et al. | |
| 2013/0270038 | A1* | 10/2013 | Nitta | B62K 11/04 184/6 |
| 2015/0046005 | A1* | 2/2015 | Kasuya | B60W 20/00 701/22 |

FOREIGN PATENT DOCUMENTS

| | | |
|---|---|---|
| JP | 2010-042810 A | 2/2010 |
| JP | 2011058640 A | 3/2011 |
| JP | 2012-002332 A | 1/2012 |
| JP | 2012-013202 A | 1/2012 |
| WO | 2009041495 A1 | 4/2009 |

* cited by examiner

POWER TRANSMISSION DEVICE

INCORPORATION BY REFERENCE

The disclosure of Japanese Patent Application No. 2012-266927 filed on Dec. 6, 2012 including the specification, drawings and abstract is incorporated herein by reference in its entirety.

BACKGROUND OF THE INVENTION

1. Field of the Invention

This invention relates to a power transmission device mounted to a vehicle such as an automobile. Specifically, the power transmission device is a transaxle or the like equipped on a hybrid vehicle.

2. Description of Related Art

In a vehicle like a hybrid vehicle which runs with the engine being at rest, an electric oil pump is usually provided in addition to the mechanical oil pump for generating the hydraulic pressure of the transmission. (Refer to Japanese Patent Application Publication No. 2012-13202 (JP 2012-13202 A), for instance.)

In JP 2012-13202 A, a discharge passages of the mechanical oil pump and of an electric oil pump are merged before being connected to a hydraulic circuit. An oil temperature sensor is provided in the passage downstream of the merging section. Further, a check valve is provided in the discharge passage of the electric oil pump.

In the above JP 2012-13202 A, relative location in vertical direction regarding each of both the oil pumps, the oil temperature sensor, and an oil-introducing portion of the hydraulic circuit is, referring to FIG. 1, such that both the oil pumps are disposed vertically lower than the passage downstream of the merging section, and that the oil temperature sensor and the oil-introducing portion of the hydraulic circuit is at almost the same height in vertical direction.

SUMMARY OF THE INVENTION

Thus once the operation of the oil pump is stopped, the oil present in the range covering from the oil pump to the oil-introducing portion of the hydraulic circuit is returned to the oil pan via the mechanical oil pump. As a result, it is concerned that the oil temperature sensor is exposed to the air, since the oil is not present around the oil temperature sensor.

Consequently, when the operation of the mechanical oil pump and the electric oil pump is stopped, it is considered that the oil temperature at the discharge end of both the oil pumps is not detected correctly by the oil temperature sensor. Also, when either of the oil pumps is restarted, it takes time for the oil to reach the discharge end of both the oil pump. Thus, it is concerned that it will take time to start detection of the oil temperature at the discharge end of both the oil pumps by the oil temperature sensor. There is a room for improvement in this regard.

By the way, a configuration will be possible in which the oil temperature at the discharge end of the mechanical oil pump and the oil temperature at the discharge end of the electric oil pump are detected respectively by the separate oil temperature sensors. In such case, however, it is concerned that the cost of equipment will increase. Also, a configuration will be possible in which a single oil temperature sensor is provided to be submerged in the oil contained in the oil pan. In that case, however, the temperature of the oil varies by location in the oil pan, and it is considered that the oil temperature may not be recognized correctly depending on where the oil temperature sensor is attached.

The present invention provides a power transmission device configured in a manner that the discharge passage of the mechanical oil pump and the discharge passage of the electric oil pump are merged before they are connected to a subject of oil supply, in which the oil temperatures at the discharge end of both the oil pumps can be detected correctly by using a single oil temperature sensor, when the operation of both the oil pumps is stopped.

A power transmission device according to an aspect of the present invention includes a first discharge passage, a second discharge passage, a merging section, an oil-introducing portion, a first check valve, a second check valve, and an oil temperature sensor. The first discharge passage is connected to a mechanical oil pump. The second discharge passage is connected to an electric oil pump. The merging section is configured in a manner that oil from the first discharge passage is merged with oil from the second discharge passage. The oil-introducing portion is connected to a subject of oil supply, with the oil-introducing portion introducing the oil from the merging section into the subject of oil supply. The first check valve is disposed on the first discharge passage. The second check valve is disposed on the second discharge passage. The oil temperature sensor is disposed at a position that is vertically lower than the oil-introducing portion of the merging section.

In this configuration, when the mechanical oil pump is operated, the oil is supplied to the merging section from the first discharge passage. When the electric oil pump is operated, the oil is supplied to the merging section from the second discharge passage.

When the operating oil pumps are stopped, the oil present in the range from the check valves to the merging section in the discharge passages, as well as the oil present in the range from the merging section to the oil-introducing portion of the subject of oil supply do not move into both the oil pumps or into the subject of oil supply, but remain where they are. One reason for this is the provision of the first check valve and the second check valve on the first discharge passage and on the second discharge passage, respectively. The other reason is that the merging section is disposed at a position that is vertically lower than the oil-introducing portion.

This keeps the oil temperature sensor submerged in the oil remaining in the merging section without being exposed to the air. Thus, the temperature of the remaining oil can be detected by the oil temperature sensor.

Consequently, the oil temperature at the discharge end of both the oil pumps, in other words, the oil temperature at the oil introducing end of the subject of oil supply can be detected correctly by a single oil temperature sensor, when the operation of both the oil pumps is stopped.

In addition, the time lag between the restart of either of the oil pumps and the start of detection for the oil temperature at the discharge end of both the oil pumps, in other words, the oil temperature at the oil introducing end of the subject of oil supply, can be curtailed in comparison with the case where the oil temperature sensor is exposed to the air, as is the case for JP 2012-13202 A, for instance.

In the power transmission device of the above aspect, the merging section may include an oil sump, and the oil temperature sensor may be disposed in the oil sump.

In this configuration, the amount of remaining oil increases because of the presence of the oil sump provided in the merging section. Thus, the oil temperature sensor is kept submerged in the remaining oil more definitely.

The power transmission device of the above aspect may further include a transmission mechanism and a housing in which the transmission mechanism is accommodated. The mechanical oil pump may be driven by the engine, the electric oil pump may be driven by an onboard battery, the subject of oil supply may be an oil cooler, and both the oil pumps may pump up the oil from inside the housing to supply it to the oil cooler and supply the oil to the transmission mechanism after the oil is cooled down by the oil cooler.

Here, the power sources of the mechanical oil pump and the electric oil pump are specified, and the subject of oil supply is specified as well.

In a power transmission device configured in a manner that the discharge passage of the mechanical oil pump and the discharge passage of the electric oil pump are merged before being connected to a subject of oil supply, the present invention enables the oil temperatures at the discharge end of both the oil pumps to be detected correctly by using a single oil temperature sensor, when the operation of both the oil pumps is stopped.

BRIEF DESCRIPTION OF THE DRAWINGS

Features, advantages, and technical and industrial significance of exemplary, embodiments of the invention will be described below with reference to the accompanying drawings, in which like numerals denote like elements, and wherein.

DETAILED DESCRIPTION OF EMBODIMENTS

An embodiment of the present invention will be described hereafter in detail with reference to the drawings attached hereto.

Figure 1:
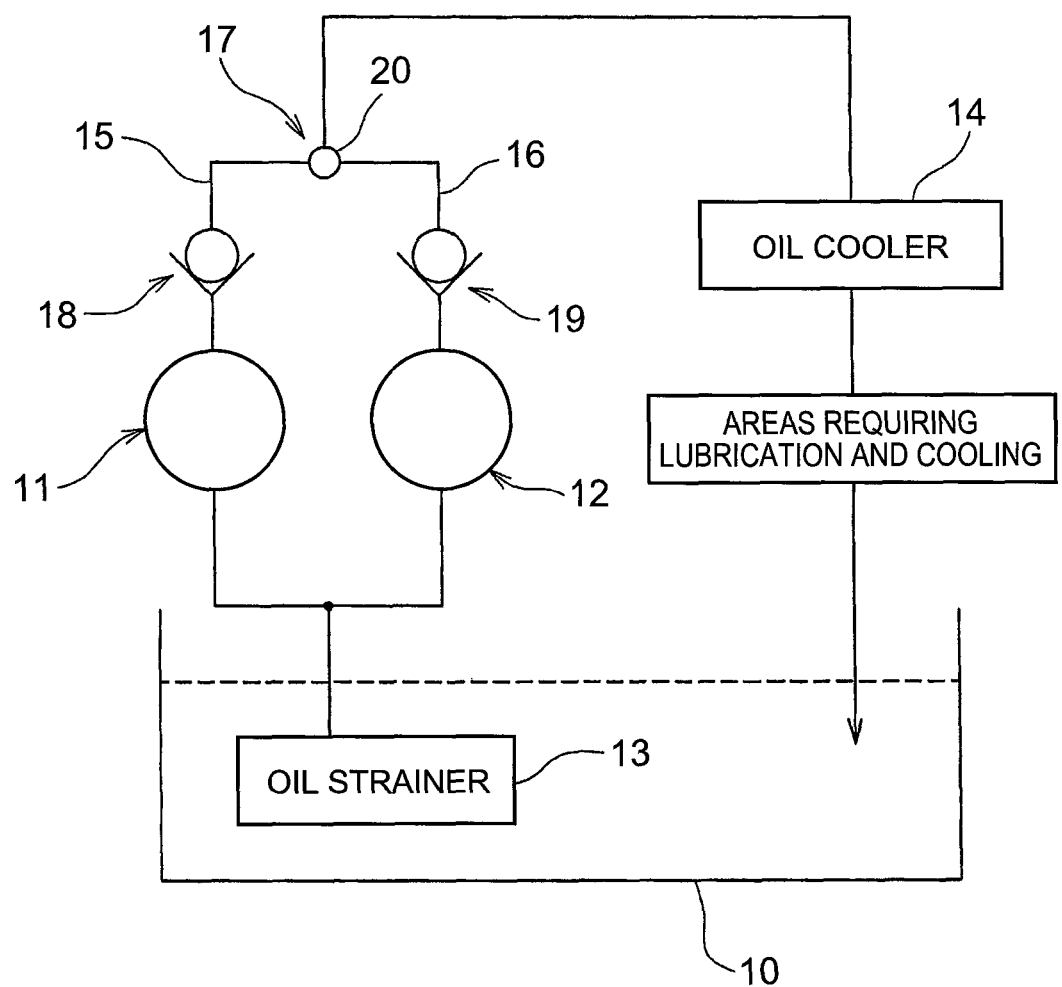
FIG. 1 is a drawing to show the general configuration of an oil circulation path according to an embodiment of the transaxle which is an example of a power transmission device according to the present invention.
Figure 2:
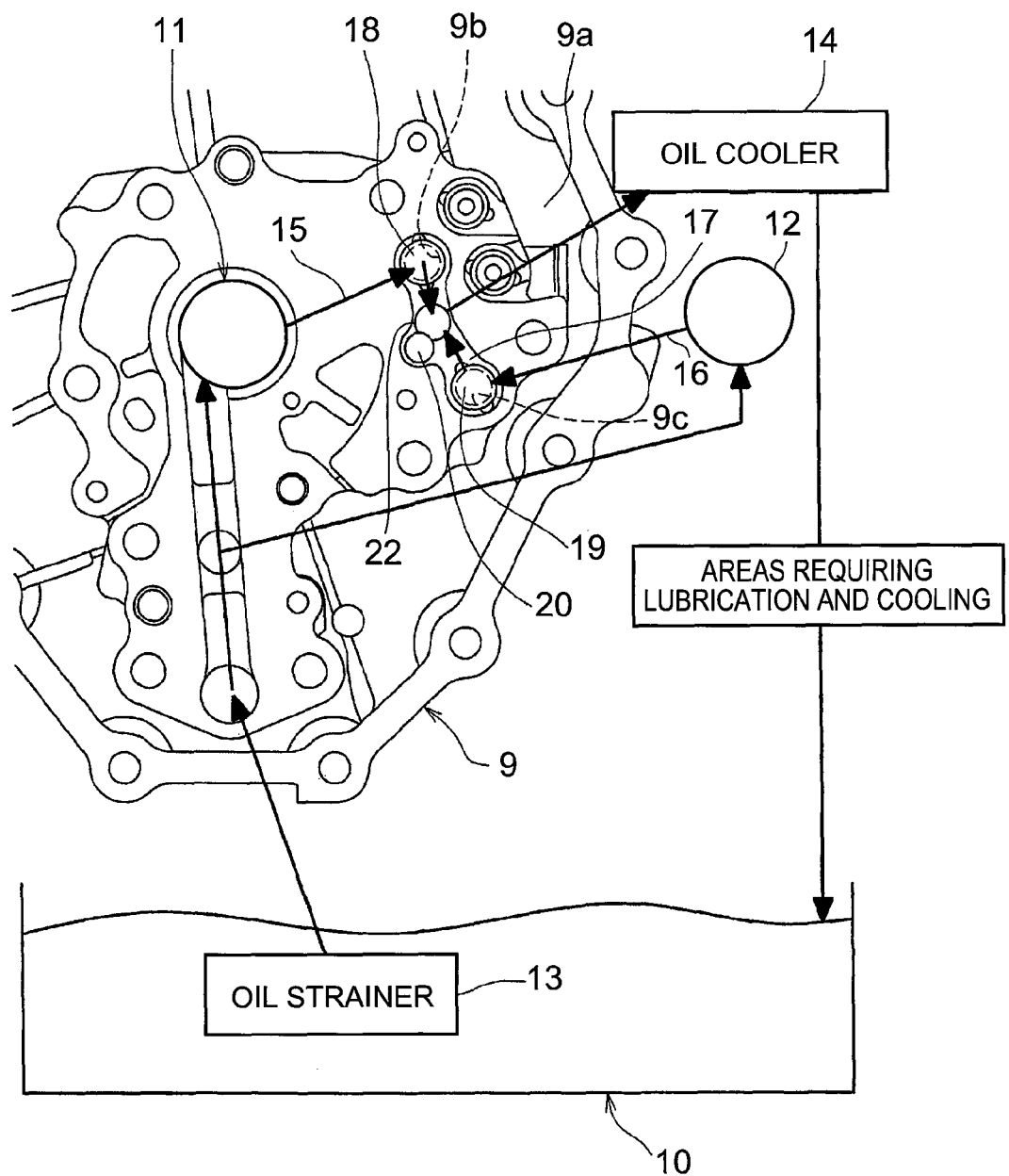
FIG. 2 is a plan view schematically showing part of an oil circulation path provided on the inner wall of the housing of the transaxle in FIG. 1.
Figure 3:
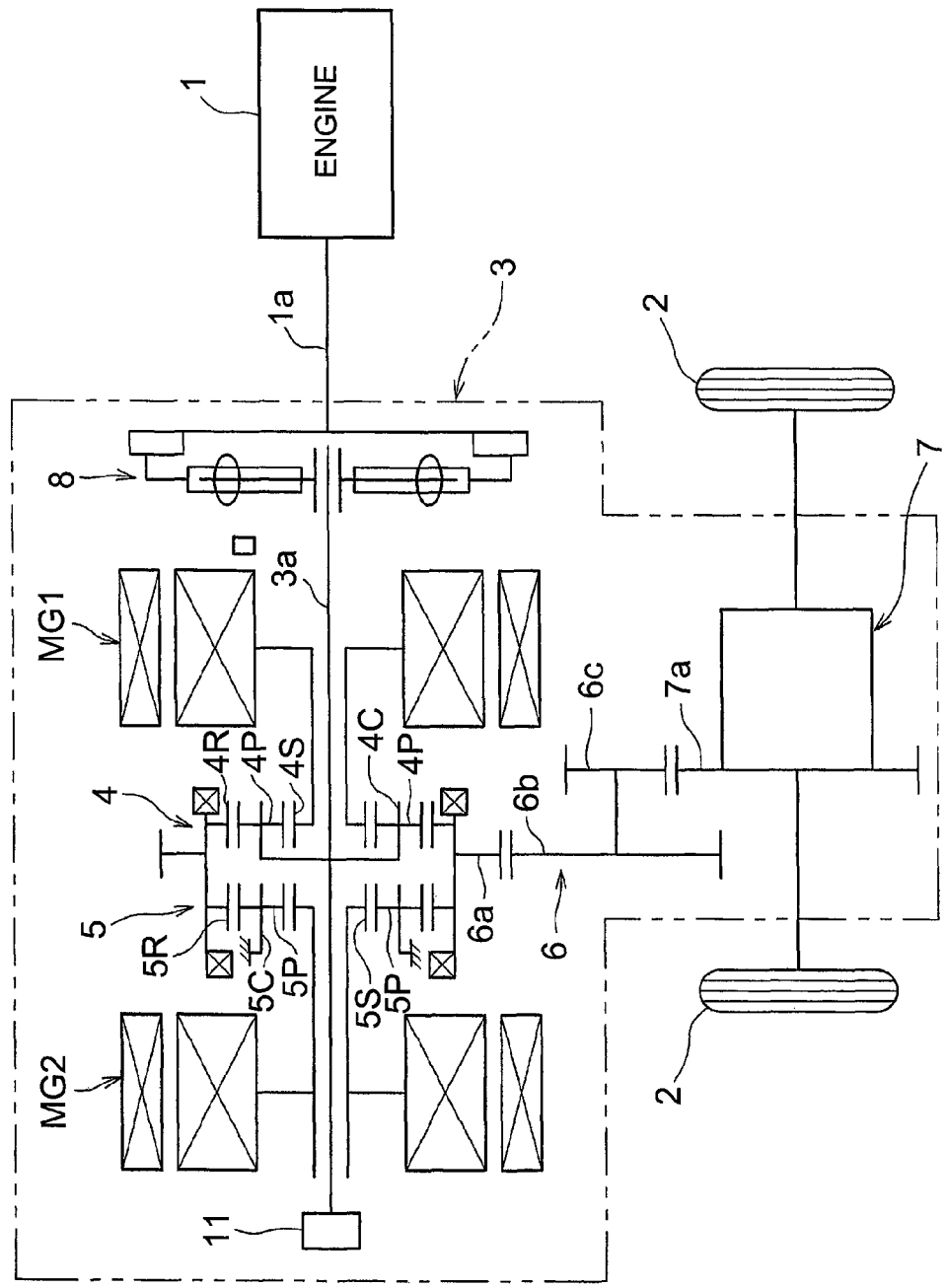
FIG. 3 is a skeleton drawing to show the general configuration of the transaxle which is the power transmission device according to this invention.

FIGS. 1 through 3 show an embodiment of the present invention. First, the general configuration of a transaxle will be described as an example of power transmission device according to the present invention referring to FIG. 3. In this embodiment, a transaxle equipped on a FF (as abbreviated from "front-engine front-drive") type hybrid vehicle is picked up as an example.

In FIG. 3, the reference numeral 1 denotes an engine (internal combustion engine), the reference numeral 2 denotes a wheel, and the reference numeral 3 denotes a transaxle.

It is configured such that when the engine 1 is operated, a crankshaft 1a is rotary driven, which in turn drives the wheel 2 in forward or in reverse via the transaxle 3.

The transaxle 3 includes a motor generator MG1, a motor generator MG2, a power splitting mechanism 4, a reduction mechanism 5, a deceleration mechanism 6, and a differential device 7.

Configuration of each constituent element of the transaxle 3, and the operation of the transaxle 3 are basically the same as a conventionally known mechanism. Thus, they will be explained briefly.

The engine 1 is a conventionally known power unit which outputs power by combusting fuel, such as a gasoline engine and a diesel engine. Although not shown, the engine 1 is configured, for example, in a manner that the operating conditions such as throttle opening angle of the throttle valve provided in the intake air passage (namely the amount of intake air), amount of injected fuel, ignition timing, and so on are controllable.

The output power from the engine 1 is transmitted to an input shaft 3a of the transaxle 3 via the crankshaft 1a and a damper 8. The damper 8 is, for instance, a coil spring-type transaxle damper which absorbs torque variation of the engine 1.

The motor generator MG1 mainly serves as a generator, and also serves as an electric motor depending on the conditions. The motor generator MG1 is an AC synchronous generator, for instance.

The motor generator MG2 mainly serves as an electric motor, and also serves as a generator depending on conditions. The motor generator MG2 is an AC synchronous electric motor, for instance.

The power splitting mechanism 4 is a planetary gear used for splitting the output power from the engine 1 into a power to drive the wheel 2 on the right and on the left, and a power to drive the motor generator MG1 to generate electricity.

Specifically, the power splitting mechanism 4 has a sun gear 4s which is of an external gear, a ring gear 4R which is an internal gear, a pinion gear 4P composed of a plurality of external gears, and a carrier 4C.

At the start of the engine 1, the motor generator MG1 is driven by the electric power supplied by an onboard battery (not shown in the figure) for cranking the engine 1. Namely, the motor generator MG1 also serves as a starter motor at the start of the engine 1.

The reduction mechanism 5 is a planetary gear for reducing the rotation input from the motor generator MG2 to amplify the driving torque.

Specifically, the reduction mechanism 5 has a sun gear 5S which is an external gear, a ring gear 5R which is an internal gear, a pinion gear 5P composed of a plurality of external gears, and a carrier 5C, as shown in FIG. 3.

The deceleration mechanism 6 reduces the output power from the power splitting mechanism 4 at a suitable reduction ratio, and transmits the reduced power to the differential device 7. The deceleration mechanism 6 has a counter drive gear 6a, a counter driven gear 6b, a final drive gear 6c, and so on.

The counter drive gear 6a is fitted into the outer periphery of the ring gear 4R to rotate integrally. The counter drive gear 6a is meshed with the counter driven gear 6b. The final drive gear 6c is provided coaxially and integrally at one side of a rotating shaft of the counter driven gear 6b. The final drive gear 6c is meshed with the ring gear 7a of the differential device 7.

The differential device 7 splits and transmits the input power from the ring gear 7a meshed with the final drive gear 6c, to the wheel 2, 2, on the right and the left, as required.

Oil used for lubrication and cooling is encapsulated in a housing 9 of the transaxle 3 configured as described above. The oil present on the bottom side of the housing 9 is supplied to areas requiring lubrication and cooling within the constituent elements of the transaxle 3, that is, the motor generator MG1, the motor generator MG2, and the power splitting mechanism 4 through differential device 7. The areas requiring lubrication and cooling includes at least a meshed area between the gears of the power splitting mechanism 4 and the deceleration mechanism 6.

The transaxle 3 according to this embodiment is configured, as shown in FIG. 1 and FIG. 2, to pump up the oil stored in an internal bottom portion (an oil pan 10) of the housing 9 via an oil strainer 13, using a mechanical oil pump 11 and the electric oil pump 12, to send the oil into an oil cooler 14 for cooling it down, and then to supply the oil to the aforementioned areas requiring lubrication and cooling.

The oil supplied to the areas requiring lubrication and cooling is then return to the oil pan 10. The oil is circulated in this way.

When the engine 1 is running, for instance, the mechanical oil pump 11 is driven by the engine 1, and thus the mechanical oil pump 11 supplies oil to the areas requiring lubrication and cooling.

By the way, in the case of hybrid vehicles, sometimes the vehicle travels by the power of the motor generator MG2, while the operation of the engine 1 is stopped. In such case, the oil is supplied to the areas requiring lubrication and cooling by the electric oil pump 12 driven by the onboard battery (not shown in the figure) or the like.

While the mechanical oil pump 11 is accommodated within the housing 9 of the transaxle 3, the electric oil pump 12 is installed outside of the housing 9.

The housing 9, although not shown in detail in the figures, has a three-piece structure in which a center case, a side case, and a rear cover are fitted together, for instance. A first discharge passage 15 of the mechanical oil pump 11, and a second discharge passage 16 of the electric oil pump 12 are provided on an inner wall of the rear cover 9*a* (see FIG. 2).

This embodiment is configured in a manner that the first discharge passage 15 of the mechanical oil pump 11 and the second discharge passage 16 of the electric oil pump 12 are merged at the merging section 17, and then connected to the oil cooler 14. A first check valve 18 and a second check valve 19 are provided on the first discharge passage 15 of the mechanical oil pump 11 and on the second discharge passage 16 of the electric oil pump 12, respectively.

Part of the merging section 17 is disposed at a position that is vertically lower than an oil-introducing portion 22 of the oil cooler 14 which represents a subject of oil supply. An oil temperature sensor 20 for detecting the temperature of the oil is provided at the part of the merging section 17.

By the way, the first discharge passage 15 and the second discharge passage 16 are cavities provided inside the ridge (not shown in the figure) that is located on the surface in a back part of the inner wall of the rear cover 9*a* in FIG. 2. The merging section 17 is a recess provided on the surface in a forward part of the inner wall of the rear cover 9*a* in FIG. 2. A space is defined inside when the open end of the recess is closed by a lid member not shown.

The first discharge passage 15 and the second discharge passage 16 made up of the cavities, are communicated with the merging section 17 made up of the recess via a through hole 9*b* and a through hole 9*c* provided on the inner wall of the rear cover 9*a* in FIG. 2. The through hole 9*b* and the through hole 9*c* serve as outlets provided on the first discharge passage 15 and the second discharge passage 16, respectively. The first check valve 18 and the second check valve 19 are provided on the through hole 9*b* and the through hole 9*c*, respectively.

As have been described so far, in the embodiment applying the present invention, the range covering from the first discharge passage 15 or the second discharge passage 16 to the oil-introducing portion 22 of the oil cooler 14 by way of the merging section 17 is filled with oil, when either of the mechanical oil pump 11 or the electric oil pump 12 is being operated.

If the operating mechanical oil pump 11 or the operating electric oil pump 12 is stopped in the above-mentioned state, the oil present in the range covering from the first check valve 18 and the second check valve 19 to the merging section 17 in the first discharge passage 15 and the second discharge passage 16, as well as the oil present in the range covering from the merging section 17 to the oil-introducing portion 22 of the oil cooler 14 do not move into both the oil pumps 11, 12 or into the oil cooler 14, but remain where they are. One reason for this is the provision of the first check valve 18 and the second check valve 19 on the first discharge passage 15 and in the second discharge passage 16. The other reason is that the part of the merging section 17 is disposed at a position that is vertically lower than an oil-introducing portion 22 of the oil cooler 14.

This keeps the oil temperature sensor 20 submerged in the oil remaining in the merging section 17 without being exposed to the air. Thus the temperature of the remaining oil can be detected by the oil temperature sensor 20.

Consequently, the oil temperature at the discharge end of both the oil pumps 11, 12, in other words, the oil temperature at the oil introducing end of the oil cooler 14 can be detected correctly by a single oil temperature sensor 20, when the operation of both the oil pumps 11, 12 is stopped.

In addition, the time lag between the restart of either of the oil pumps 11, 12 and the start of detection for the oil temperature at the discharge end of both the oil pumps 11, 12, in other words, the oil temperature at the oil introducing end of the oil cooler 14, can be curtailed in comparison with the case where the oil temperature sensor is exposed to the air, as is the case for JP 2012-13202 A, for instance.

It should be understood that the present invention is not limited to the above embodiment and any modification is possible within the scope of the claims and within the scope equivalent to the claims. Examples of modifications will be described below.

Although the above embodiment describes an example in which the present invention is applied to the transaxle 3 mounted on an FF (front engine front drive) vehicle, the present invention is not limited to this example, but is also applicable to the power transmission device including a transaxle or an automatic transmission device mounted to an FR (front engine rear drive) vehicle, for instance, or other types of vehicles.

Figure 4:
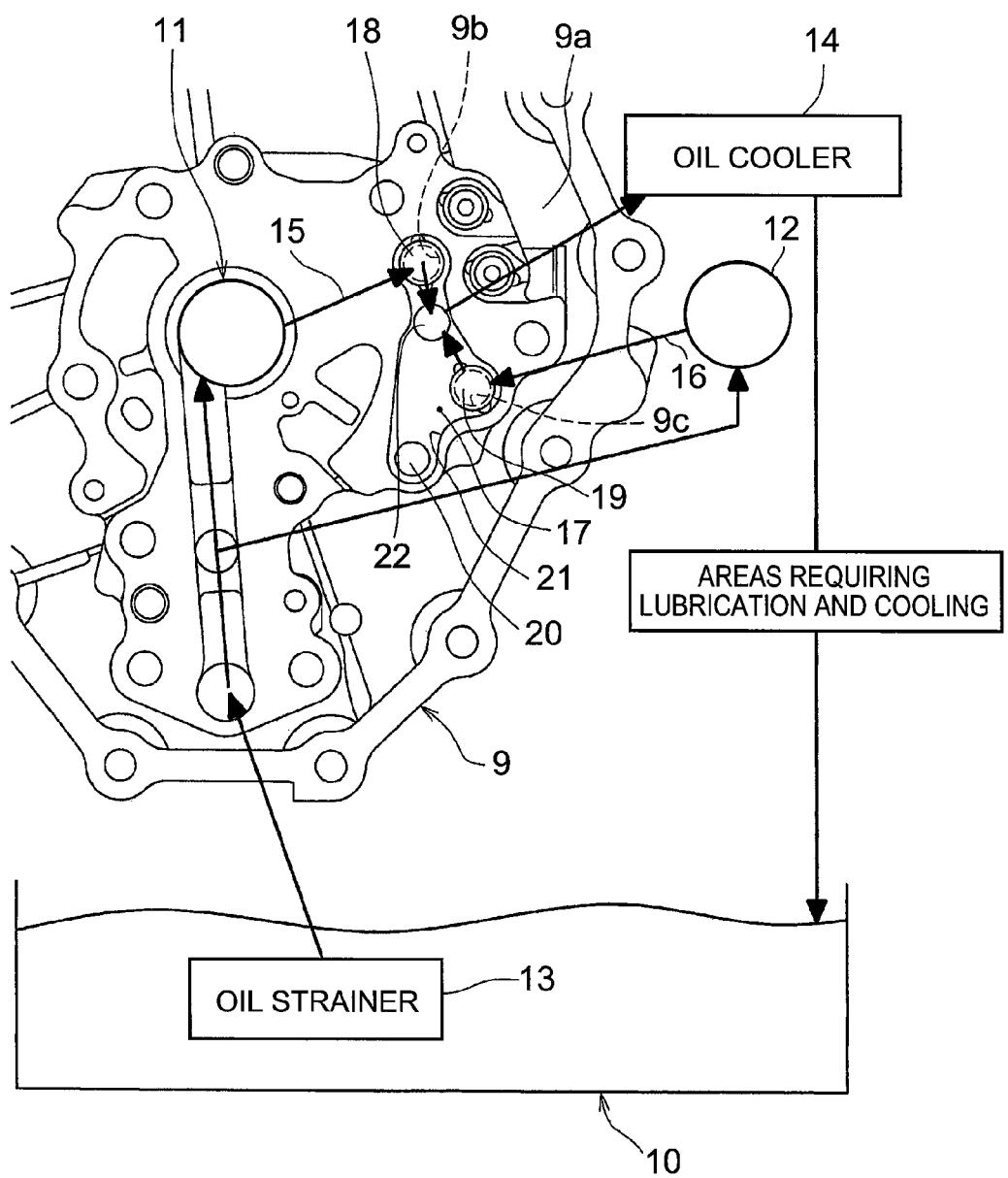
FIG. 4 is a drawing to show an example of modification regarding the attachment location of the oil temperature sensor in FIG. 2.

As shown in FIG. 4, an oil sump 21 protruding downwardly in the peripheral direction may be provided in the merging section 17 that is composed of a recess, and the oil temperature sensor 20 may be disposed in the oil sump 21.

In an example shown in FIG. 4, the oil sump 21 is expanded to reach vertically below the second discharge passage 16 of the electric oil pump 12 which is located relatively lower. In addition, the oil temperature sensor 20 is disposed vertically below the second discharge passage 16 of the electric oil pump 12.

According to this configuration, as the operation of the mechanical oil pump 11 or the electric oil pump 12 is stopped, the amount of remaining oil increases in comparison with the embodiment shown in FIG. 2, because of the presence of the oil sump 21 provided in the merging section 17. Thus, the oil temperature sensor 20 is kept submerged in the remaining oil more definitely.

Also, when the oil sump 21 is provided, the amount of oil remaining in the oil sump 21 can be increased, even when the operation of the mechanical oil pump 11 or the electric oil pump 12 is stopped with the inclined transaxle 3 in such case that the vehicle is coming up or down the hill. Thus, the oil temperature sensor 20 is kept submerged in the oil remaining in the oil sump 21 without being exposed to the air.

Besides, although not shown in the figure, a projection surrounding the oil sump 21 may be provided, for instance, to restrain the oil from leaking out of the oil sump 21, when the operation of the mechanical oil pump 11 or the electric oil pump 12 is stopped with the inclined transaxle 3 in such case that the vehicle is coming up or down the hill. In this case, the oil temperature sensor 20 is kept submerged in the remaining oil within the oil sump 21 without being exposed to the air.

Although the above embodiment describes an example in which suction ends of the mechanical oil pump 11 and the electric oil pump 12 are merged and the single oil strainer 13 is attached to the merged passage, the present invention is not limited to this configuration.

For instance, although not shown in the figure, the oil strainer may be attached to each of both the suction ends, without merging the suction ends of the mechanical oil pump 11 and the electric oil pump 12 as in the case of the above embodiment.

The present invention can be suitably utilized in a power transmission device configured in a manner that the discharge passage of the mechanical oil pump and the discharge passage of the electric oil pump are merged before being connected to the subject of oil supply.

The invention claimed is:

1. A power transmitting device comprising:
a first discharge passage connected to a mechanical oil pump;
a second discharge passage connected to an electric oil pump;
a merging section connected to the first discharge passage and the second discharge passage such that oil from the first discharge passage is merged with oil from the second discharge passage, wherein the merging section includes an oil sump;
an oil-introducing portion connected to the merging section and an oil cooler, the oil-introducing portion introducing the oil from the merging section into the oil cooler, wherein the merging section is disposed at a position that is vertically lower than the oil-introducing portion;
a first check valve provided on the first discharge passage;
a second check valve provided on the second discharge passage;
an oil temperature sensor disposed in the oil sump; and
wherein the oil sump is located vertically below the entirety of the first and second discharge passages.

2. The power transmitting device according to claim 1, further comprising:
a transmission mechanism; and
a housing accommodating the transmission mechanism, wherein
the mechanical oil pump is driven by an engine,
the electric oil pump is driven by an onboard battery, and
the mechanical oil pump and the electric oil pump pump up oil from inside the housing to supply the oil to the oil cooler, and supply the oil cooled in the oil cooler to the transmission mechanism.

* * * * *